United States Patent
Miyoshi et al.

(10) Patent No.: US 8,369,307 B2
(45) Date of Patent: Feb. 5, 2013

(54) RECEIVING APPARATUS, TRANSMITTING APPARATUS AND COMMUNICATION METHOD

(75) Inventors: Kenichi Miyoshi, Yokohama (JP); Hidetoshi Suzuki, Yokosuka (JP)

(73) Assignee: Panasonic Corporation, Osaka (JP)

( * ) Notice: Subject to any disclaimer, the term of this patent is extended or adjusted under 35 U.S.C. 154(b) by 960 days.

(21) Appl. No.: 10/520,787

(22) PCT Filed: Jul. 29, 2003

(86) PCT No.: PCT/JP03/09569
§ 371 (c)(1), (2), (4) Date: Jan. 11, 2005

(87) PCT Pub. No.: WO2004/017555
PCT Pub. Date: Feb. 26, 2004

(65) Prior Publication Data
US 2006/0013156 A1    Jan. 19, 2006

(30) Foreign Application Priority Data
Aug. 12, 2002   (JP) ................................ 2002-235119

(51) Int. Cl.
*H04J 3/24* (2006.01)

(52) U.S. Cl. ........ 370/349; 370/329; 370/331; 370/235; 714/707; 714/708; 714/704

(58) Field of Classification Search .................. 370/329, 370/331, 235; 714/707, 708, 704
See application file for complete search history.

(56) References Cited

U.S. PATENT DOCUMENTS

| | | | |
|---|---|---|---|
| 5,148,431 A * | 9/1992 | Hayashi | 714/704 |
| 5,535,205 A * | 7/1996 | Horii | 370/347 |
| 5,689,439 A * | 11/1997 | Weerackody et al. | 370/329 |
| 5,771,467 A | 6/1998 | Sato | |
| 6,662,330 B1 * | 12/2003 | Hershey | 714/748 |
| 2002/0027882 A1 * | 3/2002 | Burmeister et al. | 370/252 |
| 2002/0028687 A1 * | 3/2002 | Sato et al. | 455/466 |
| 2002/0046379 A1 | 4/2002 | Miki et al. | |
| 2002/0058493 A1 * | 5/2002 | Ikeda et al. | 455/403 |

(Continued)

FOREIGN PATENT DOCUMENTS
JP    58125936    7/1993
(Continued)

OTHER PUBLICATIONS
International Search Report dated Nov. 24, 2005.
PCT International Search Report dated Nov. 4, 2003.

*Primary Examiner* — Rafael Pérez-Gutiérrez
*Assistant Examiner* — Liton Miah
(74) *Attorney, Agent, or Firm* — Dickinson Wright PLLC

(57) ABSTRACT

Scheduler 304 performs scheduling such that the communication terminal apparatuses to transmit packets to are determined according to the order in CIR information output from demodulator 303, and determines the modulation schemes and coding rates of the packets. Command detector 305 detects an ARQ command transmitted from the communication terminal apparatus determined in scheduler 304, outputs an ACK/NACK signals to buffer 306, and outputs a SUSUPEND signal or a GIVEUP signal to scheduler 304. Scheduler 304 stops retransmission upon receiving a SUSPEND signal or a GIVEUP signal from command detector 305, and redoes the scheduling. Thus, it is possible to improve overall system throughput in a wireless communication system that performs packet transmission.

18 Claims, 5 Drawing Sheets

| U.S. PATENT DOCUMENTS | | | | |
|---|---|---|---|---|
| 2002/0064167 A1* | 5/2002 | Khan et al. | | 370/410 |
| 2002/0080719 A1* | 6/2002 | Parkvall et al. | | 370/235 |
| 2002/0159553 A1* | 10/2002 | McCarty et al. | | 375/362 |
| 2002/0191573 A1* | 12/2002 | Whitehill et al. | | 370/338 |
| 2002/0199147 A1* | 12/2002 | Kim et al. | | 714/748 |
| 2003/0031143 A1 | 2/2003 | Faerber | | |
| 2003/0076787 A1 | 4/2003 | Katz et al. | | |
| 2003/0095508 A1* | 5/2003 | Kadous et al. | | 370/252 |
| 2004/0013105 A1* | 1/2004 | Ahmavaara et al. | | 370/349 |
| 2004/0203973 A1* | 10/2004 | Khan | | 455/517 |

| FOREIGN PATENT DOCUMENTS | | |
|---|---|---|
| JP | 6141025 | 5/1994 |
| JP | 11177536 | 7/1999 |
| JP | 11252103 | 9/1999 |
| JP | 2001 53728 A | 2/2001 |
| JP | 2001 119426 | 4/2001 |
| JP | 2002 9741 A | 1/2002 |
| JP | 2002 26747 A | 1/2002 |
| WO | 0158197 | 8/2001 |

* cited by examiner

RECEIVING APPARATUS, TRANSMITTING APPARATUS AND COMMUNICATION METHOD

TECHNICAL FIELD

The present invention relates to a receiving apparatus, transmitting apparatus and communication method that perform packet transmission.

BACKGROUND ART

Downlink high rate packet transmission schemes (including HSDPA) in which a plurality of communication terminal apparatuses share a high rate and large capacity downlink channel are being developed. These transmission schemes employ scheduling techniques for improved transmission efficiency.

A scheduling technique refers to a technique of having a base station apparatus set the communication terminal apparatus for the transmission destination of packets and assign packets to transmit to the apparatus on a per time slot basis. Moreover, an adaptive modulation technique refers to a technique of determining modulation schemes or error correction coding schemes adaptively according to propagation path condition of the communication terminal apparatus to transmit packets to.

The base station apparatus estimates channel quality with each communication terminal apparatus on a per time slot basis in one frame, selects the communication terminal apparatus having the best channel quality, and assigns packets for the apparatus to each time slot. The base station apparatus performs error correction encoding and modulation of the packets by schemes determined through scheduling, and transmits the packets with information showing the scheduling result.

Based on the received information showing the scheduling result, each communication terminal apparatus performs decoding and error detection processing including CRC detection in a time slot to which a packet to its own station is assigned. When the packet data is correctly decoded, an ACK signal showing this result is transmitted to the base station apparatus, and, when the packet data is not correctly decoded, a NACK signal showing this result is transmitted to the base station apparatus.

Upon receiving the NACK signal the base station apparatus retransmits the previously transmitted packet or transmits a packet combinable with the previously transmitted packet in the time slot assigned by the scheduling. However, the packet is discarded and a new packet is transmitted when the number of times of retransmission reaches the maximum number of times for retransmission previously set in the system.

However, there is a problem with the conventional system that, the base station apparatus retransmits a packet upon receiving a NACK signal, and repeats packet retransmission to the communication terminal apparatus having poor channel quality when transmitting the packets to a plurality of communication terminal apparatuses during scheduling, thus overall system throughput is reduced.

DISCLOSURE OF INVENTION

An object of the present invention is to provide a receiving apparatus, a transmitting apparatus and a communication method capable of improving overall system throughput in a wireless communication system that performs packet transmission.

The object is achieved by having a base station apparatus stop retransmission of packet and redo the scheduling upon receiving a SUSPEND signal that instructs to temporarily suspend packet transmission or a GIVEUP signal that instructs to stop packet transmission.

BEST MODE FOR CARRYING OUT THE INVENTION

Embodiments of the present invention will be described below in detail with reference to the accompanying drawings.

(Embodiment 1)

Figure 1:
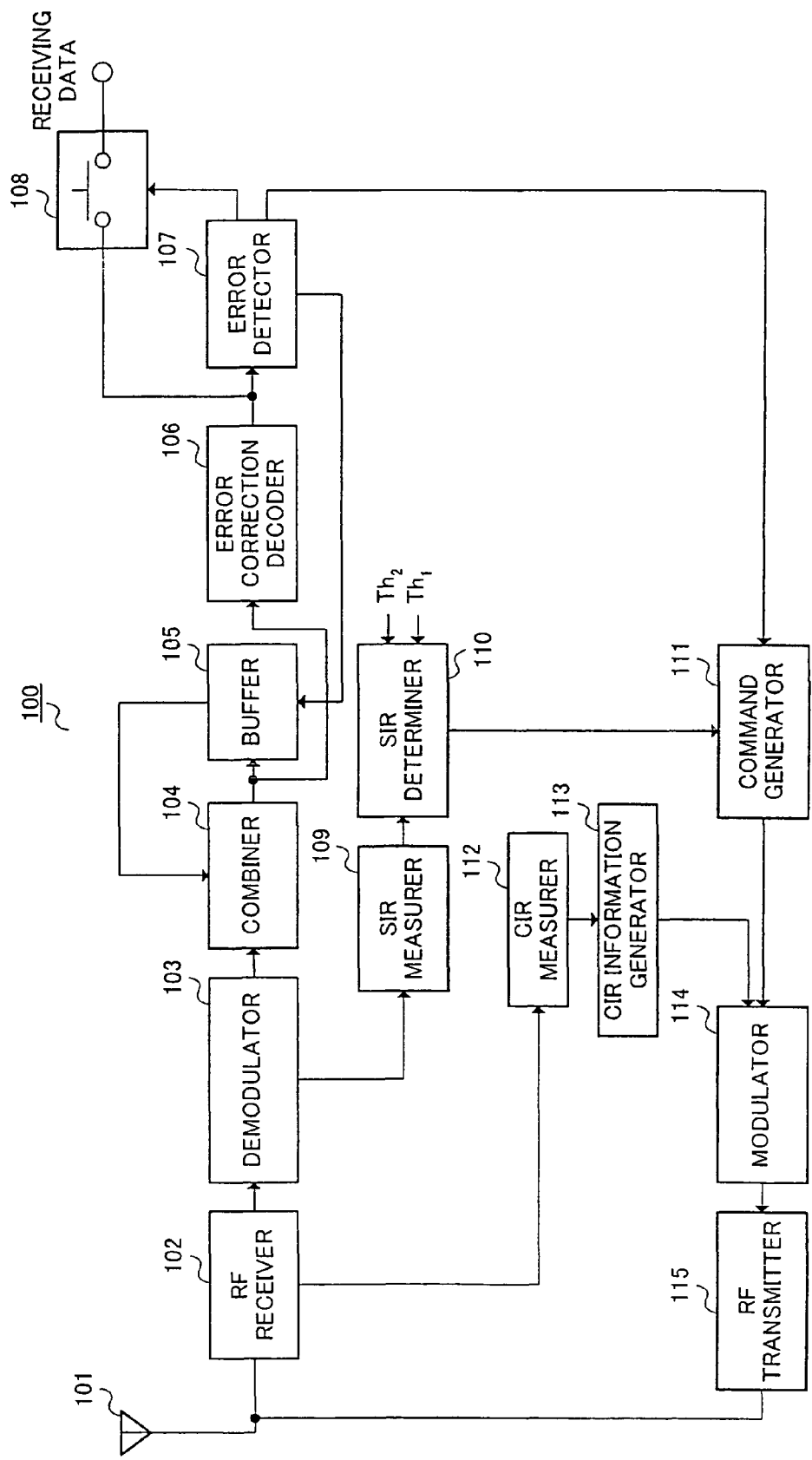
FIG. 1 is a block diagram illustrating a configuration of a communication terminal apparatus according to Embodiment 1 of the present invention.

FIG. 1 is a block diagram showing the configuration of a communication terminal apparatus according to Embodiment 1 of the present invention. Communication terminal apparatus 100 shown in FIG. 1 has antenna 101, RF receiver 102, demodulator 103, combiner 104, buffer 105, error correction decoder 106, error detector 107, switch 108, SIR (Signal to Interference Ratio) measurer 109, SIR determiner 110, command generator 111, CIR (Carrier to Interference Ratio) measurer 112, CIR information generator 113, modulator 114, and RF transmitter 115.

RF receiver 102 performs predetermined radio processing upon a signal received by antenna 101, outputs a baseband signal of the dedicated channel to demodulator 103, and outputs a baseband signal of the common control channel to CIR measurer 112.

Demodulator 103 demodulates the output signal from RF receiver 102 and outputs the result to combiner 104. In addition, demodulator 103 outputs the desired signal level and the interference signal level measured during the modulation process to SIR measurer 109.

Combiner 104 combines the output signal from demodulator 103 with a signal saved in buffer 105, and outputs the composite signal to buffer 105 and to error correction decoder 106. Buffer 105 outputs the signal saved therein to combiner 104, and overwrites and saves therein the new signal output from combiner 104.

Error correction decoder 106 performs error correction decoding processing including Viterbi decoding upon the signal output from combiner 104, and outputs the result to error detector 107. Error detector 107 performs an error detection (CRC decision) on the output signal from error correction decoder 106, and, when an error is detected, outputs a NACK signal to command generator 111. On the other hand, when no error is detected, error detector 107 deletes the signal saved in buffer 105, connects switch 108, and outputs an ACK signal to command generator 111. As a result, when no error is detected, the received data output from error correction decoder 106 is output to an unillustrated apparatus that performs subsequent processing.

SIR measurer 109 measures the ratio between the desired signal level and the interference signal level (i.e. the SIR), and outputs a signal that represents the measurement result to SIR determiner 110. SIR determiner 110 draws a scale comparison of the SIR measured at SIR measurer 109 to threshold level Th1 and threshold level Th2 that are set in advance (Threshold level Th1>Threshold level Th2), and outputs a signal that represents the comparison result to command generator 111.

When the SIR is greater than threshold level Th1, command generator 111 outputs the ACK signal or the NACK signal output from error correction decoder 106 to modulator 114. Moreover, when the SIR is below threshold level Th1 yet greater than threshold level Th2, command generator 111 outputs a SUSPEND signal that instructs to temporarily suspend the packet transmission. When the SIR is below threshold level Th2, command generator 111 outputs a GIVEUP signal that instructs to stop the packet transmission to modulator 114. In addition, when after the SUSPEND signal has been transmitted a packet for another communication terminal apparatus has a greater SIR than threshold level Th1, command generator 111 outputs a RESUME signal that instructs to resume the packet transmission to modulator 114. Hereinafter the signals generated at command generator 111 will be collectively referred to as "ARQ command."

CIR measurer 112 uses the signal of the common control channel and measures the ratio between the carrier and the interference signal level (CIR), and outputs a signal that represents the measurement result to CIR information generator 113. CIR information generator 113 outputs information (hereinafter "CIR information") that represents the CIR measured at CIR measurer 112 to modulator 114.

Modulator 114 modulates the ARQ command output from command generator 111 and the CIR information output from CIR information generator 113, and outputs the result to RF transmitter 115. RF transmitter 115 converts the output signal from modulator 114 into radio frequency, and transmits the result from antenna 101 by radio.

Next, ARQ according to the present embodiment will be described in detail with reference to FIG. 2.

Figure 2:
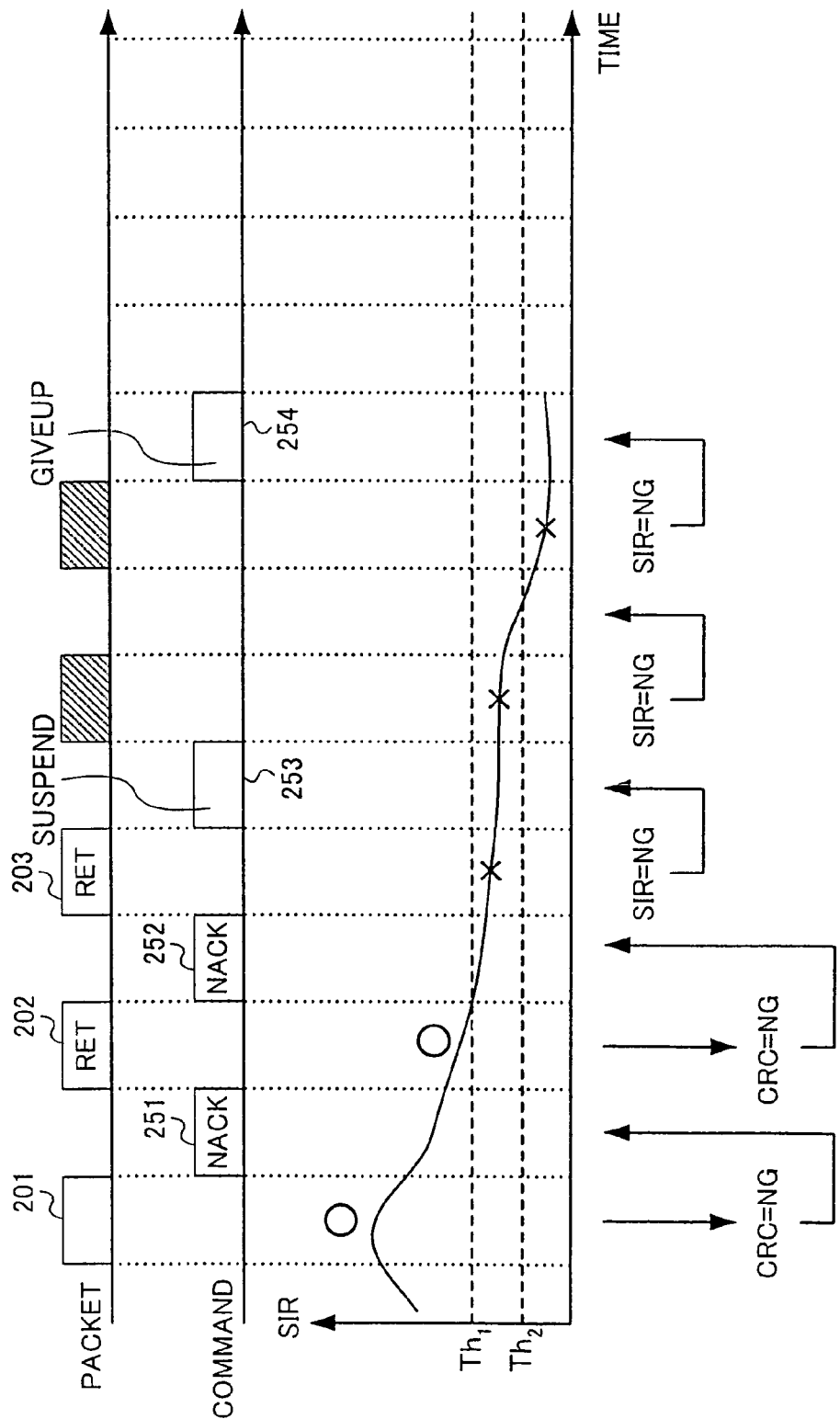
FIG. 2 is a view specifically explaining ARQ of Embodiment 1 of the present invention.

FIG. 2 assumes a case where communication terminal apparatus 100 first receives new packet 201. Communication terminal apparatus 100 saves packet 201 in buffer 105, performs error correction decoding processing upon packet 201 in error correction decoder 106, and performs error detection processing in error detector 107. In addition, communication terminal apparatus 100 measures the SIR of packet 201 in SIR measurer 109, and draws a scale comparison of the SIR to threshold levels Th1 and Th2 in SIR determiner 110. If, as a result, an error is detected (CRC=NG) and the SIR is greater than threshold level Th1, communication terminal apparatus 100 transmits a NACK signal 251 to the base station apparatus.

Next, communication terminal apparatus 100 receives retransmission packet (RET) 202, saves a composite packet (201+202) in buffer 105, performs error correction decoding processing upon the composite packet (201+202) in error correction decoder 106, and performs error detection processing in error detector 107. In addition, communication terminal apparatus 100 measures the SIR of packet 202 in SIR measurer 109, and draws a scale comparison of the SIR to threshold levels Th1 and Th2 in SIR determiner 110. If, as a result, an error is detected (CRC=NG) and the SIR is greater than threshold level Th1, communication terminal apparatus 100 transmits NACK signal 252 to the base station apparatus.

Next, communication terminal apparatus 100 receives retransmission packet 203, saves a composite packet (201+ 202+203) in buffer 105, performs error correction decoding processing upon the composite packet (201+202+203) in error correction decoder 106, and performs error detection processing in error detector 107. In addition, communication terminal apparatus 100 measures the SIR of packet 203 in SIR measurer 109, and draws a scale comparison of the SIR to threshold levels Th1 and Th2 in SIR determiner 110. If, as a result, an error is detected (CRC=NG) and the SIR is below threshold level Th1 yet greater than threshold level Th2, communication terminal apparatus 100 transmits SUSPEND signal 253 to the base station apparatus.

By this means, the base station apparatus transmits packets to other communication terminal apparatuses for a predetermined period of time (in FIG. 2, a time period of 2 frames).

Next, when the 2-frame time period is over, communication terminal apparatus 100 measures the SIR of a packet for another communication terminal apparatus in SIR measurer 109, and draws a scale comparison of the SIR to threshold levels Th1 and Th2 in SIR measurer 110. If, as a result, the SIR is below threshold level Th2, communication terminal apparatus 100 transmits GIVEUP signal 254 to the base station apparatus.

Thus, in addition to ACK./NACK signals, the communication terminal apparatus of the present embodiment transmits SUSPEND signals, RESUME signals, and GIVEUP signals depending on the relationships between the receiving SIR and the threshold levels in scale.

Incidentally, referring to FIG. 2, if, after a SUSPEND signal has been transmitted, the SIR of a packet for another communication terminal apparatus is greater than threshold level Th1, communication terminal apparatus 100 transmits a RESUME signal to the base station apparatus, and resumes receiving retransmission packet 204.

Figure 3:
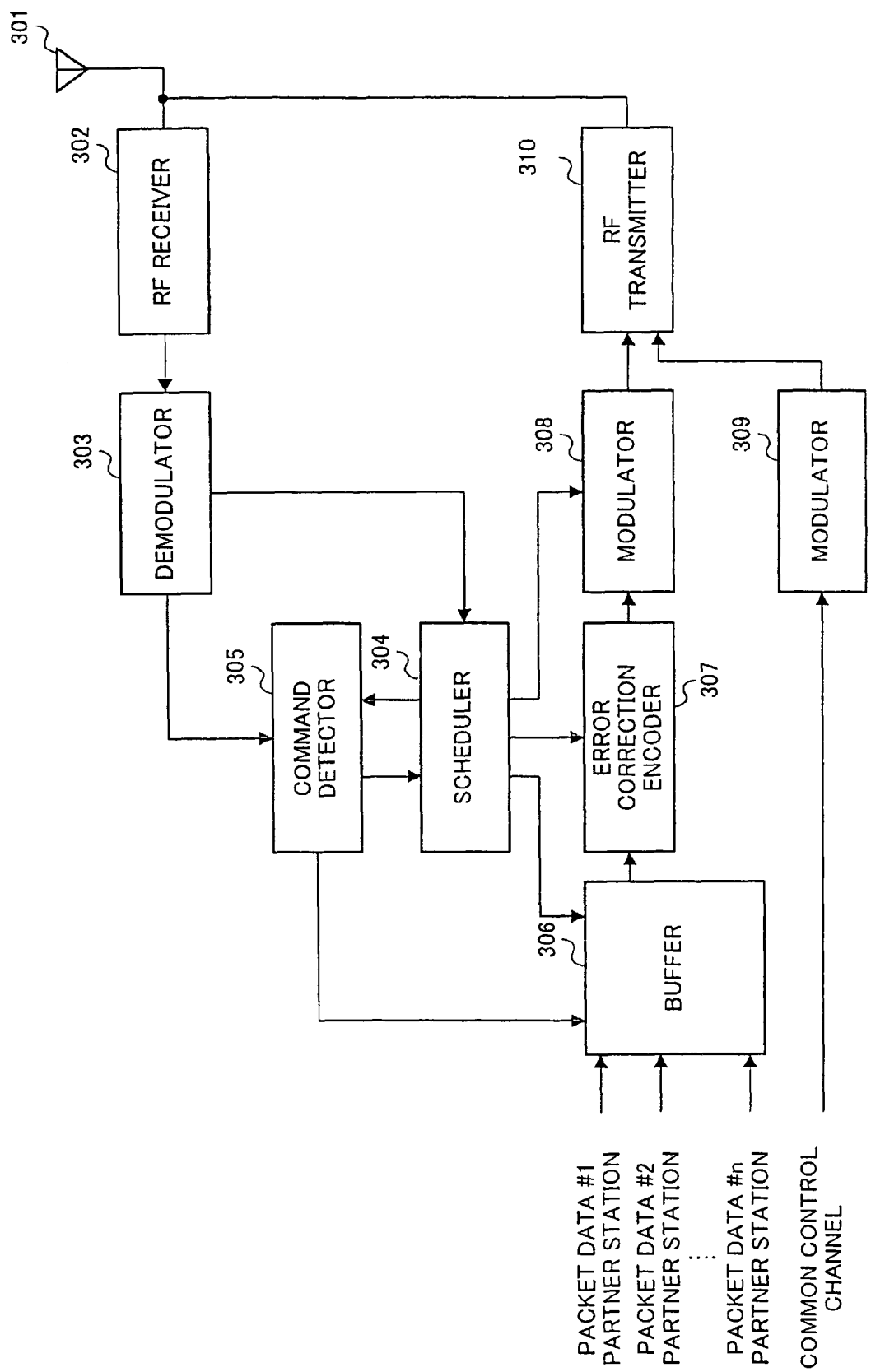
FIG. 3 is a block diagram illustrating the configuration of a base station apparatus according to Embodiment 1 of the present invention.

Next, the configuration of a base station apparatus according to the present embodiment will be described with reference to the block diagram of FIG. 3. Base station apparatus 300 shown in FIG. 3 is configured essentially with antenna 301, RF receiver 302, demodulator 303, scheduler 304, command detector 305, buffer 306, error correction encoder 307, modulators 308 and 309, and RF transmitter 310.

RF receiver 302 performs predetermined radio processing upon a signal transmitted from a communication terminal apparatus currently engaged in communication and received by antenna 301, and outputs a baseband signal to demodulator 303. Demodulator 303 demodulates the output signal from RF receiver 302, outputs the ARQ command to command detector 305, and outputs the CIR information to scheduler 304.

Scheduler 304 performs a scheduling such that the communication terminal apparatuses to transmit packets to are determined according to the order in the CIR information output from demodulator 303, and determines the modulation schemes and the coding rates for the packets. Then, scheduler 304 outputs a signal that represents a communication terminal apparatus to transmit a packet to, to command detector 305 and buffer 306, outputs a signal that represents the coding rate to error correction encoder 307, and outputs a signal that represents the modulation scheme to modulator 308.

Also, scheduler 304 stops retransmission when receiving a SUSPEND signal or a GIVEUP signal from command detector 305, and redoes the scheduling.

Among the ARQ commands, command detector 305 detects the one transmitted from the communication terminal apparatus selected in scheduler 304, outputs an ACK/NACK signal to buffer 306, and outputs a SUSPEND signal or a GIVEUP signal to scheduler 304.

Buffer 306 selects the data for the communication terminal apparatus specified by scheduler 304. Thereupon, when receiving an ACK signal from command detector 305, buffer 306 deletes the data stored therein, and outputs new data to error correction encoder 307 while also storing the new data. On the other hand, when receiving a NACK signal from command detector 305, buffer 306 outputs the data stored therein to error correction encoder 307.

Error correction encoder 307 attaches a CRC bit to the output signal from buffer 306, and performs error correction encoding processing by a scheme of the coding rate selected in scheduler 304 and outputs the result to modulator 308. Modulator 308 modulates the output signal from error correction encoder 307 by the modulation scheme selected in scheduler 304 and outputs the result to RF transmitter 310.

Modulator 309 modulates the signal of the common control channel and outputs the result to RF transmitter 310. RF transmitter 310 converts the output signals from modulator 308 and modulator 309 into radio frequency, and transmits the result from antenna 301 by radio.

Next, the scheduling by the base station apparatus of the present embodiment will be described in detail with reference to FIG. 4A and FIG. 4B.

Figure 4A:
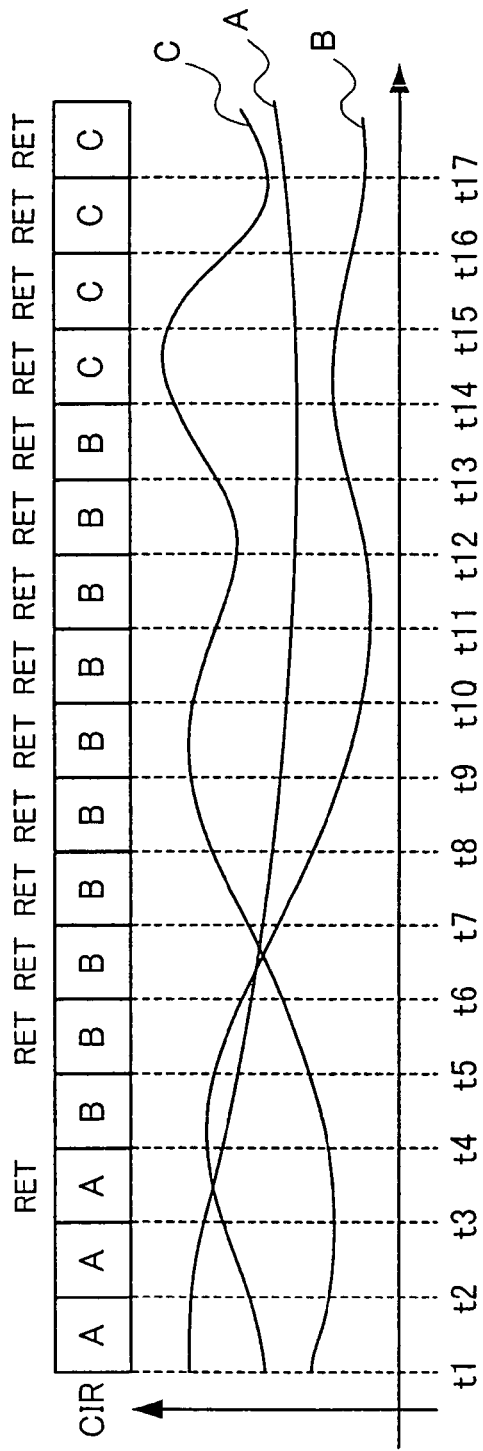
FIG. 4A is a view specifically explaining scheduling according to Embodiment 1 of the present invention.

FIG. 4A shows conventional scheduling. In this case, a packet is transmitted to the communication terminal apparatus having the highest CIR upon transmission of the packet (for instance, terminal A at time t1 and terminal B at time t4), and, when a NACK signal is received, the packet is retransmitted (RET). Afterwards, when errors keep being detected in the communication terminal apparatus to which the packet was transmitted, the base station apparatus repeats retransmission up to the maximum number of times for retransmission (9 times) (times t5 to t13), and thereafter gives up retransmitting the packet to the communication terminal apparatus (terminal B), and, at the next timing (time t14), transmits the packet to the communication terminal apparatus then having the highest CIR (terminal C).

Figure 4B:
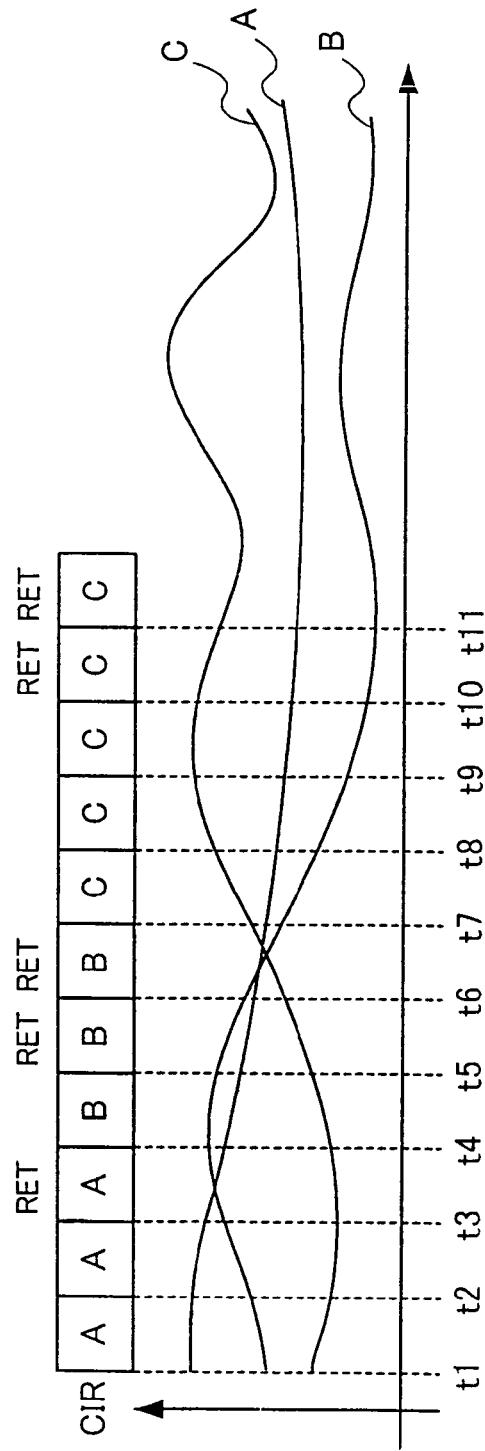
FIG. 4B is a diagram specifically explaining scheduling according to Embodiment 1 of the present invention; and, FIG. 5 is a block diagram illustrating the configuration of a communication terminal apparatus according to Embodiment 2 of the present invention.

By contrast with this, with the scheduling according to the present invention shown in FIG. 4B, when a SUSPEND signal is received at time t7 from terminal B, the base station apparatus temporarily suspends the retransmission of the packet to terminal B, and transmits the packet to terminal C having the highest CIR at time t7.

Thus, the base station apparatus, upon receiving a SUSPEND signal that instructs to temporarily suspend packet transmission or a GIVEUP signal that instructs to stop packet transmission, stops retransmitting packets and redoes the scheduling, so that it is possible to reduce the number of retransmission packets and improve overall system throughput.

Incidentally although a case has been described with the present embodiment where threshold level Th1 and threshold level Th2 are predetermined levels, the present invention is by no means limited to this, and it is equally possible to variably control the threshold levels such as by, for example, detecting the error rate and determining threshold levels that keep the error rate at a constant level.

(Embodiment 2)

A case has been described with Embodiment 1 where a communication terminal apparatus transmits a SUSPEND signal or a GIVEUP signal to the base station apparatus immediately when the SIR is below a predetermined threshold level. By contrast with this, a case will be described here with Embodiment 2 where a communication terminal apparatus transmits a SUSPEND signal or a GIVEUP signal to a base station apparatus according to another criterion of judgment.

Figure 5:
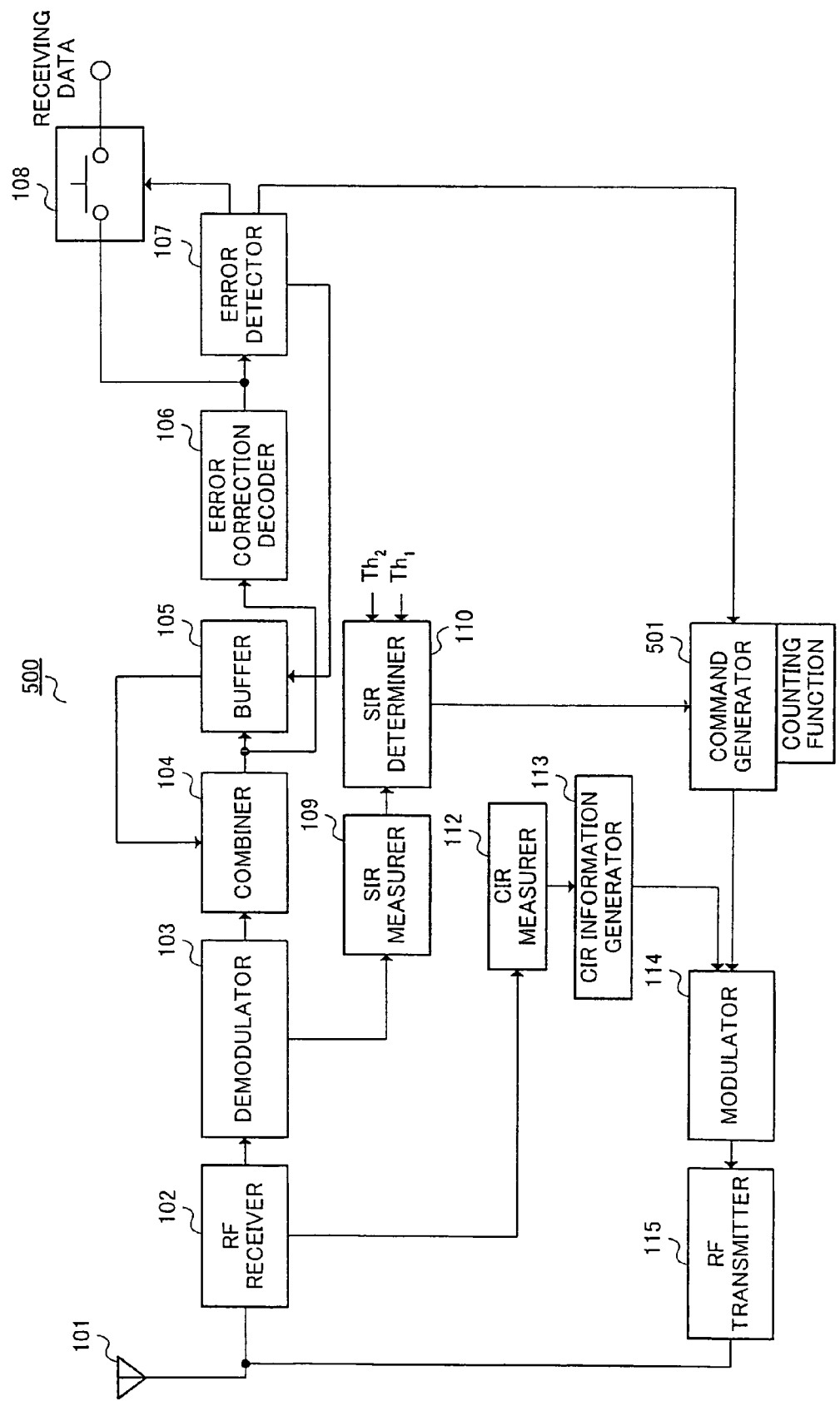

FIG. 5 is a block diagram illustrating the configuration of a communication terminal apparatus according to Embodiment 2 of the present invention. Parts in communication terminal apparatus 500 shown in FIG. 5 that are identical with those of communication terminal apparatus 100 shown in FIG. 1 are assigned the same reference numerals, and explanations thereof are omitted.

In communication terminal apparatus 500 shown in FIG. 5, the operation of command generator 501 is different than command generator 111 in FIG. 1.

Command generator 501 has a counting function and counts the number of times the same determination result is output from SIR determiner 110 consecutively and/or the number of times NACK signals are output from error detector 107 consecutively, and generates a command according to whether or not the count value reaches a predetermined number.

For example, according to determination results by SIR determiner 110, if the SIR is below threshold level Th1 and greater than threshold level Th2 for two consecutive slots, a SUSPEND signal is generated, and thereafter a RESUME signal is generated if the SIR of at least one slot is greater than threshold level Th1. Alternatively, if the SIR is below threshold level Th2 for three consecutive slots, a SUSPEND signal is generated. In addition, regardless of determination results by SIR determiner 110, a SUSPEND signal is generated if there is an output from error detector 107 for three consecutive slots.

Thus, the communication terminal apparatus of the present embodiment compares the receiving SIR to threshold levels and transmits ACK/NACK signals, SUSPEND signals, RESUME signals and GIVEUP signals according to the number of times the same comparison result continues. By this means, the base station apparatus, upon receiving a SUSPEND signal or a GIVEUP signal, stops retransmitting packets and redoes the scheduling, so that it is possible to further reduce the number of retransmission packets and improve overall system throughput.

Incidentally, although a case has been described with each of the embodiments above where a command is generated depending on the relationship between the measured SIR and the threshold level in scale, the present invention is by no means limited to this, and it is equally possible to use, instead of the SIR, other parameters including the CIR, likelihood of receiving signals, and receiving electric field intensity.

Moreover, although a downlink packet transmission system has been described with each of the embodiments above where packets are transmitted from the base station apparatus to the communication terminal apparatus, the present invention is equally applicable to an uplink packet transmission system.

In addition, the present invention is applicable to a system where individual base station apparatuses are provided for the uplink and the downlink.

As obvious from the above descriptions, according to the present invention, the communication terminal apparatus transmits a SUSPEND signal, a RESUME signal and a GIVEUP signal other than ACK/NACK signals to the base station apparatus, and upon receiving a SUSPEND signal or a GIVEUP signal, the base station apparatus stops retransmitting packets and redoes the scheduling, so that it is possible to reduce the number of retransmission packets and improve overall system throughput.

This application is based on Japanese Patent Application No. 2002-235119 filed on Aug. 12, 2002, entire content of which is expressly incorporated by reference herein.

Industrial Applicability

The present invention is suitable for use of a communication terminal apparatus and a base station apparatus that perform packet transmission.

FIG. 1
102 RF RECEIVER
103 DEMODULATOR
104 COMBINER
105 BUFFER
106 ERROR CORRECTION DECODER
107 ERROR DETECTOR
(108) RECEIVING DATA
109 SIR MEASURER
110 SIR DETERMINER
111 COMMAND GENERATOR
112 CIR MEASURER
113 CIR INFORMATION GENERATOR
114 MODULATOR
115 RF TRANSMITTER
FIG. 2
PACKET
COMMAND
TIME
FIG. 3
PACKET DATA #1 OF PARTNER STATION
PACKET DATA #2 OF PARTNER STATION
PACKET DATA #n OF PARTNER STATION
COMMON CONTROL CHANNEL
302 RF RECEIVER
303 DEMODULATOR
304 SCHEDULER
305 COMMAND DETECTOR
306 BUFFER
307 ERROR CORRECTION ENCODER
308 MODULATOR
309 MODULATOR
310 RF TRANSMITTER
FIG. 5
102 RF RECEIVER
103 DEMODULATOR
104 COMBINER
105 BUFFER
106 ERROR CORRECTION DECODER
107 ERROR DETECTOR
(108) RECEIVING DATA
109 SIR MEASURER
110 SIR DETERMINER
112 CIR MEASURER
113 CIR INFORMATION GENERATOR
114 MODULATOR
115 RF TRANSMITTER
501 COMMAND GENERATOR
COUNTING FUNCTION

The invention claimed is:

1. A base station apparatus using an automatic repeat request (ARQ) procedure, said base station apparatus comprising:
a reception unit configured to receive data from a terminal apparatus in an uplink;
an error detection unit configured to perform an error detection for the data by using an error-detecting code; and
a transmission unit configured to transmit, to the terminal apparatus:
(i) an acknowledgment (ACK) signal when said error detection unit detects no error;
(ii) a negative acknowledgement (NACK) signal when said error detection unit detects an error; and
(iii) a control signal, which is a different signal from the ACK signal and the NACK signal, pairing with the ACK signal or the NACK signal, for governing operations, which are performed in the terminal apparatus, including a new transmission, a retransmission, and no transmission of a new transmission and a retransmission,
wherein the base station apparatus is configured to perform the ARQ procedure by cooperating with the terminal apparatus which performs the operations governed by the control signal and performs no operation according to only the ACK signal or the NACK signal.

2. The base station apparatus according to claim 1, wherein said control signal is for governing the operation that the base station apparatus resumes a retransmission after performing no retransmission.

3. The base station apparatus according to claim 1, wherein said control signal is for governing the operations that the terminal apparatus performs no transmission and keeps data in a buffer.

4. The base station apparatus according to claim 1, wherein said control signal is for governing the operations that the terminal apparatus suspends a transmission and performs no transmission.

5. The base station apparatus according to claim 1, wherein the control signal is a suspend signal, said suspend signal for governing the operations that the terminal apparatus suspends a transmission and performs no transmission, or a resume signal, said resume signal for governing the operation that the terminal apparatus resumes a retransmission after performing no retransmission.

6. The base station apparatus according to claim 1, further comprising a channel quality measurement unit configured to measure a channel quality between the terminal apparatus and the base station apparatus, wherein the transmission unit transmits the control signal based on the channel quality.

7. The base station apparatus according to claim 6, wherein said control signal is for governing the operations that the terminal apparatus performs no transmission and keeps data in a buffer when the channel quality is equal to or less than a threshold.

8. The base station apparatus according to claim 6, wherein said control signal is for governing the operations that the terminal apparatus performs no transmission and keeps data in a buffer when the channel quality is equal to or less than a threshold, and said control signal is for governing the operation that the terminal apparatus resumes a retransmission after performing no retransmission when the channel quality become greater than the threshold.

9. The base station apparatus according to claim 6, wherein the base station apparatus performs:
(i) transmitting an ACK signal when said error detection unit detects no error for the data;
(ii) transmitting a NACK signal when said error detection unit detects an error for the data and the channel quality is greater than a threshold;
(iii) transmitting the control signal for governing the operations that the terminal apparatus performs no transmission and keeps data in a buffer when said error detection unit detects an error for the data and the channel quality is equal to or less than the threshold; and (iv) transmitting the control signal for governing the operation that the terminal apparatus resumes a retransmission after performing no retransmission when the channel quality become greater than the threshold.

10. A terminal apparatus using an automatic repeat request (ARQ) according to claim 1 comprising;
   a reception unit configured to receive an acknowledgment/negative-acknowledgment (ACK/NACK) signal and the control signal which are transmitted from the base station apparatus according to claim 1; and
   a transmission unit configured to transmit data, based on the ACK/NACK signal and the control signal.

11. The base station apparatus according to claim 1, further comprising a channel quality measurement unit, wherein the transmission unit transmits a NACK signal when said error detection unit detects an error for the data and a channel quality measurement unit determines that the channel quality is greater than a threshold.

12. The base station apparatus according to claim 1, further comprising a channel quality measurement unit, wherein the control signal governs operations that:
   the terminal apparatus performs no transmission and keeps data in a buffer when said error detection unit detects an error for the data and a channel quality measurement unit determines that the channel quality is equal to or less than a first threshold and greater than a second threshold,
   the terminal apparatus resumes a transmission after performing no transmission when the channel quality measurement unit determines that the channel quality becomes greater than the first threshold, and
   the terminal apparatus stops and reschedules a transmission after performing no transmission when the channel quality measurement unit determines that the channel quality becomes equal to or less than the second threshold.

13. A terminal apparatus using an automatic repeat request (ARQ), the terminal apparatus comprising:
   a transmission unit configured to perform operations, including a new transmission, a retransmission and no transmission of a new transmission and a retransmission to a base station apparatus; and
   a reception unit configured to receive an acknowledgment/negative-acknowledgment (ACK/NACK) signal, which is transmitted based on a result of an error detection performed by using an error-detecting code in the base station apparatus, and a control signal which is transmitted from the base station apparatus and is a different signal from the ACK/NACK signal, and which is for governing said operations;
   wherein said transmission unit performs the operations governed by the control signal pairing with the ACK signal or the NACK signal, and performs no operation according to only the ACK signal or the NACK signal.

14. The terminal apparatus according to claim 13, wherein said transmission unit resumes a retransmission after performing no retransmission based on the control signal.

15. The terminal apparatus according to claim 13, wherein said transmission unit performs no transmission and keeps data in a buffer based on the control signal.

16. The terminal apparatus according to claim 13, wherein said transmission unit suspends a transmission and performs no transmission based on the control signal.

17. A radio receiving method using an automatic repeat request (ARQ) procedure comprising;
   receiving data from a terminal apparatus in an uplink;
   performing an error detection for the data by using an error-detecting code;
   transmitting, to the terminal apparatus in a downlink:
   an acknowledgment (ACK) signal when the error detection detects no error;
   a negative acknowledgement (NACK) signal when the error detection detects an error; and
   a control signal, which is a different signal from the ACK signal and the NACK signal, pairing with the ACK signal or the NACK signal, for governing operations, which are performed in the terminal apparatus, including a new transmission, a retransmission, and no transmission of a new transmission and a retransmission,
   wherein the ARQ procedure is performed in cooperation with the terminal apparatus which performs the operations governed by the control signal and performs no operation according to only the ACK signal or the NACK signal.

18. A radio transmitting method using an automatic repeat request (ARQ) comprising:
   performing operations, including a new transmission, a retransmission and no transmission of a new transmission and a retransmission to a base station apparatus;
   receiving an acknowledgment/negative-acknowledgment (ACK/NACK) signal, which is transmitted based on a result of an error detection performed by using an error-detecting code for the data in the base station apparatus, and a control signal which is transmitted from the base station apparatus and which is a different signal from the ACK/NACK signal, and which is for governing said operations; and
   wherein the operations governed by the control signal pairing with the ACK signal or the NACK signal are performed, and no operation is performed according to only the ACK signal or the NACK signal.

* * * * *

UNITED STATES PATENT AND TRADEMARK OFFICE
CERTIFICATE OF CORRECTION

| | | |
|---|---|---|
| PATENT NO. | : 8,369,307 B2 | Page 1 of 1 |
| APPLICATION NO. | : 10/520787 | |
| DATED | : February 5, 2013 | |
| INVENTOR(S) | : Kenichi Miyoshi et al. | |

It is certified that error appears in the above-identified patent and that said Letters Patent is hereby corrected as shown below:

Item (56) References Cited, Foreign Patent Documents, Title Page 1 reads:

"JP......58125936......7/1993"

and should read:

"JP......58125936......7/1983".

Item (56) References Cited, Foreign Patent Documents, Title Page 2 reads:

"WO......0158197......8/2001"

and should read:

"WO......01058197......8/2001".

In the Claims

Claim 17, column 10, line 13 reads:

"request (ARQ) procedure comprising;"

and should read:

"request (ARQ) procedure comprising:".

Signed and Sealed this
Twenty-second Day of April, 2014

Michelle K. Lee
*Deputy Director of the United States Patent and Trademark Office*